(12) United States Patent  
Lee

(10) Patent No.: US 6,188,062 B1  
(45) Date of Patent: Feb. 13, 2001

(54) LASER/DETECTOR HYBRID WITH INTEGRATED MIRROR AND DIFFRACTED RETURNED BEAM

(75) Inventor: Wai-Hon Lee, Cupertino, CA (US)

(73) Assignee: Hoetron, Inc., Sunnyvale, CA (US)

( * ) Notice: Under 35 U.S.C. 154(b), the term of this patent shall be extended for 0 days.

(21) Appl. No.: 09/057,109

(22) Filed: Apr. 8, 1998

(51) Int. Cl.$^7$ .................................................. G11B 7/00
(52) U.S. Cl. ........................... 250/237 G; 250/239
(58) Field of Search ................. 250/239, 237 G, 250/552, 216; 372/43, 50; 359/13, 15; 369/44.14, 44.23, 44.37, 103, 112

(56) References Cited

U.S. PATENT DOCUMENTS

| | | | |
|---|---|---|---|
| 3,863,075 | * 1/1975 | Ironmonger et al. | 250/552 |
| 4,906,839 | 3/1990 | Lee | 250/239 |
| 5,285,062 | * 2/1994 | Lee | 250/216 |
| 5,689,108 | 11/1997 | Ohyama | 250/239 |
| 5,727,009 | 3/1998 | Tajiri et al. | 372/43 |
| 5,783,488 | * 7/1998 | Bothra et al. | 438/692 |
| 5,804,464 | * 9/1998 | Beilstein, Jr. et al. | 438/109 |
| 5,872,762 | * 2/1999 | Feldman et al. | 369/112 |
| 5,886,971 | * 3/1999 | Feldman et al. | 369/112 |

FOREIGN PATENT DOCUMENTS

| | | | |
|---|---|---|---|
| 0 729 143 A2 | 8/1996 | (EP) | G11B/11/10 |
| 0 749 119 A2 | 12/1996 | (EP) | G11B/7/135 |

OTHER PUBLICATIONS

Walpole, R&D On Surface–Emitting Diode Lasers, Laser Focus/Electro–Optics, Sep. 1987, pp. 66–74.*
Abstract/Zusammenfassung/Abrege—XS 9930204510 MA.

* cited by examiner

Primary Examiner—John R. Lee
(74) Attorney, Agent, or Firm—Townsend and Townsend and Crew LLP

(57) ABSTRACT

The present laser/detector hybrid with a turning mirror integrated into the photo detector chip. This allows a smaller package for the device and a simpler method for producing the laser/detector device. The laser beam is emitted along the surface of the chip towards a groove cut in the chip. A mirror is mounted in the groove, and the mirror has a corrugated structure so that it will reflect the beam and convert it into multiple beams at the same time.

12 Claims, 5 Drawing Sheets

LASER/DETECTOR HYBRID WITH INTEGRATED MIRROR AND DIFFRACTED RETURNED BEAM

BACKGROUND OF THE INVENTION

The present invention relates to semiconductor laser and detector devices, and in particular to those for generating multiple beams. U.S. Pat. No. 5,285,062 described a laser/detector for use in optical pickups. In that device, as shown in FIG. 1, a laser chip 110 is mounted on top of a multiple element detector 120 which contains light sensitive elements for detecting a returned beam from a medium and also the back emission of the edge emitting laser chip 110. The mirror 150 redirects the light upwards towards the medium. The mirror surface is also corrugated to split the laser beam from laser chip 110 into 3 beams. Holographic element 160 is used to diffract a portion of the returned beam to light sensitive elements on detector 120. A ceramic substrate 130 supports the integrated laser/detector device. A retainer 180 holds together the mirror 150, hologram 160 with its holder 170 and the ceramic substrate 130 to complete the device.

One type of semiconductor laser is called a surface emitting laser. One structure for a surface emitting laser uses a semiconductor lasing device which emits the laser beam into a groove in the semiconductor chip. The opposite end of a groove includes a mirror for directing the laser beam from the surface of the semiconductor chip. Such a device is shown, for instance, in FIG. 2B of U.S. Pat. No. 4,906,839.

SUMMARY OF THE INVENTION

The present invention is an improvement over U.S. Pat. No. 5,285,062 in that the turning mirror is integrated into the photo detector chip. This allows a smaller package for the device and a simpler method for producing the laser/detector device. The laser beam of the apparatus of this invention is emitted along the surface of the chip towards a groove cut in the chip. A mirror is mounted in the groove, and the mirror has a corrugated structure so that it will reflect the beam and convert it into multiple beams at the same time.

In one embodiment, the invention includes a multiple element photo detector on the other side of the mirror for detecting the returned, diffracted light. The apparatus may be encapsulated in a clear plastic, with a diffraction grating mounted above the mirror to diffract the light on the return path.

For further understanding of the nature and advantages of the invention, reference should be made to the following description taken in conjunction with the accompanying drawings.

DETAILED DESCRIPTION OF THE INVENTION

Figure 1:
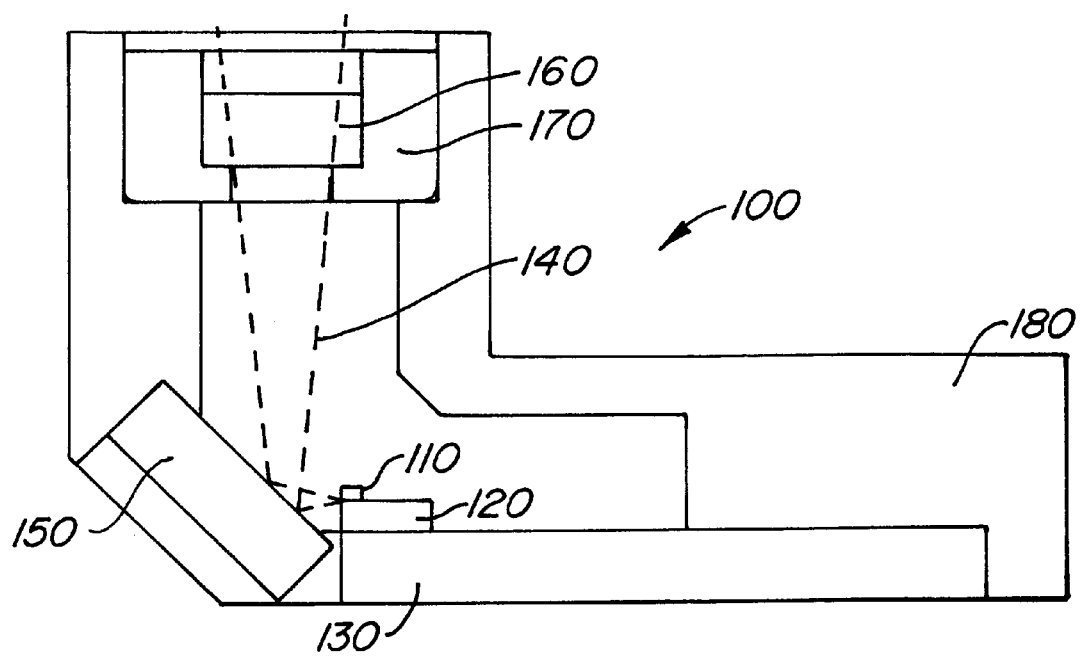
FIG. 1 is a diagram of a prior art laser/detector device.
Figure 2:
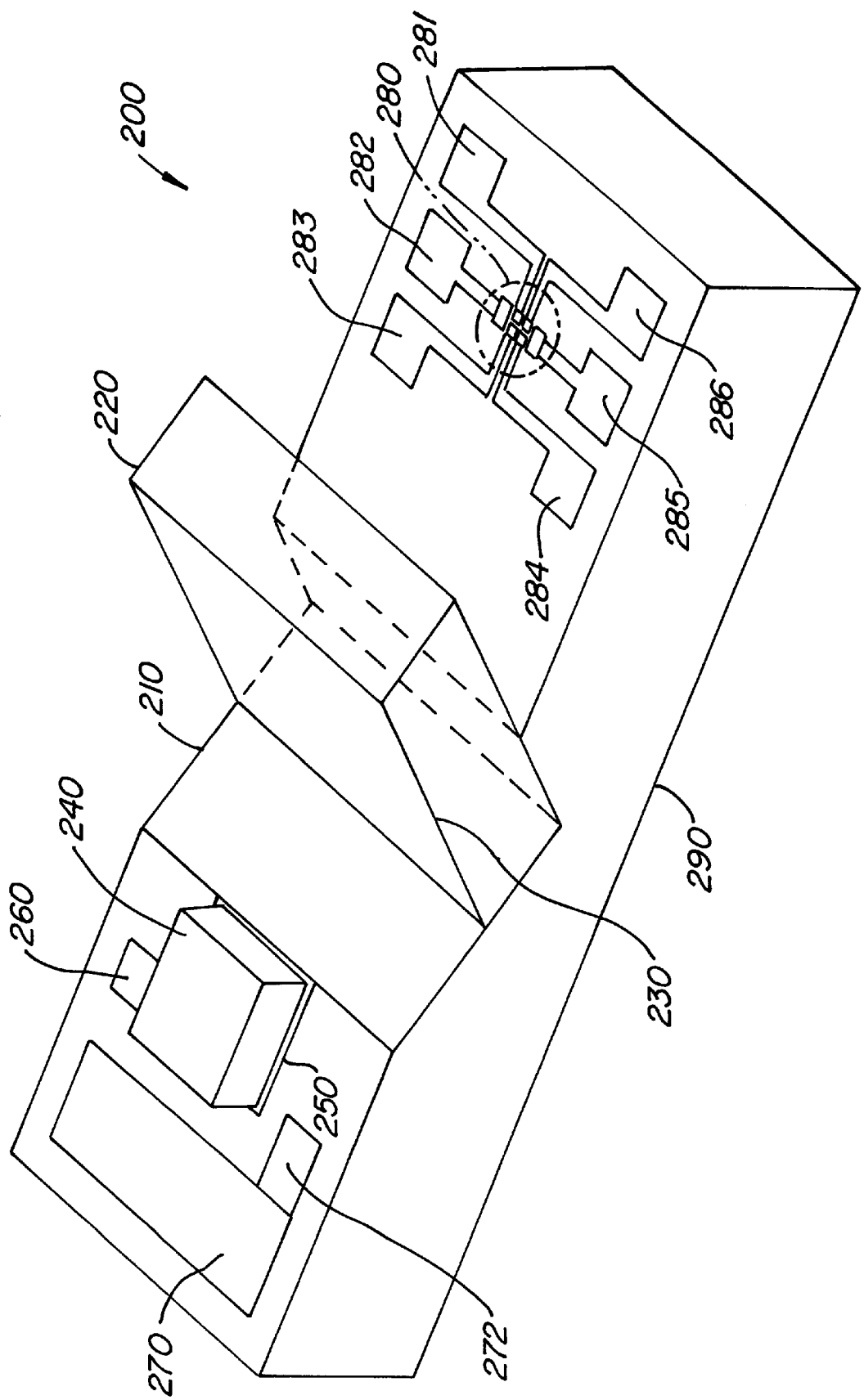
FIG. 2 is a diagram of an embodiment of the photo detector of this invention.

FIG. 2 shows an embodiment of the present invention. A photo detector device 200 is shown to have a V-shaped groove 210 etched on its surface. The photo detector is fabricated on a special silicon wafer which has a crystal plane subtending a 45 degree angle with respect to the surface of the wafer as shown in FIG. 2. A mirror 220 is attached to that 45 degree surface by means of adhesive or metallic bonding material such as thin solder. A corrugated structure with period T has been etched on top surface 230 of the mirror 220.

Figure 3:
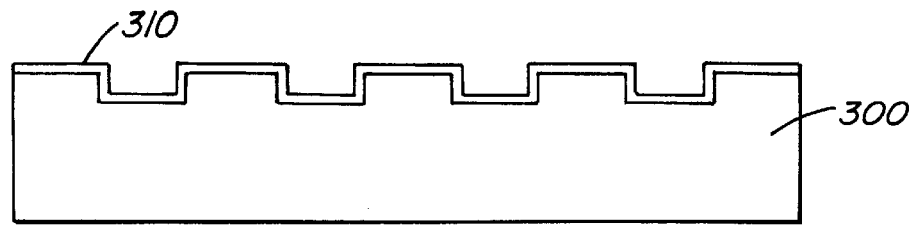
FIG. 3 is a diagram of the corrugated mirror.

FIG. 3 shows the edge view of the corrugated mirror surface. A thin metal layer 310 such as gold or aluminum is coated on top of the corrugated structure to reflect light emitted by the laser chip 240. It is well known that a periodic structure along the path of an optical beam can split the beam into multiple beams. It is the purpose of this corrugated mirror to divide the laser beam into 3 or more beams.

In the case that the corrugated structure is designed to split the laser beam into three beams, the central beam retains about 65% of the power of the laser beam, and the intensity of the two first order beams is about ⅕ of the central beams. Laser chip 240 is attached to pad 250 on the photo detector by means of electrically conductive adhesive. A bonding pad 260 allows electrical connection be made to the bottom of the laser chip 240. A light sensitive area 270 behind the laser chip 240 is to detect the back light emission from the laser chip and thus serves as a laser power monitor. Pad 272 is for connecting to the anode of the detector element 270. On the back side of the mirror 220 is a set of photo detectors 280 which has six elements, a,b,c,d,e, and f in this preferred embodiment. Additional detector elements can be implemented for multichannel readouts. Pads 281,282,283,284, 285,286 are respectively for the anodes of the detectors a,b,c,d,e, and f. The back surface of the detector 290 provide the contact to the cathode of all the light sensitive elements.

Figure 4:
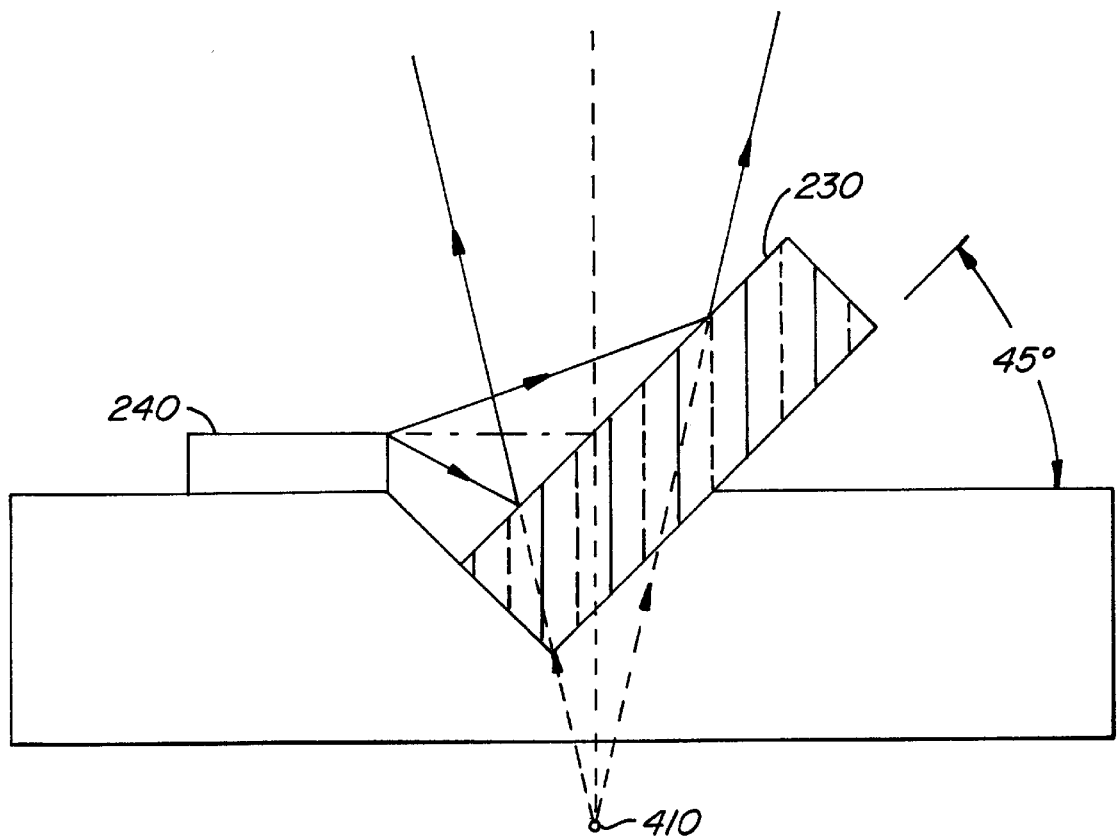
FIG. 4 is a side view of the photo detector of this invention.

FIG. 4 shows the side view of this laser/detector device. As can be seen, the light beam emitted by the laser chip 240 is reflected by the mirror surface 230 upwards as though a virtual laser source is located at position 410. The angle between the mirror and the top surface of the detector is 45 degrees.

Figure 5:
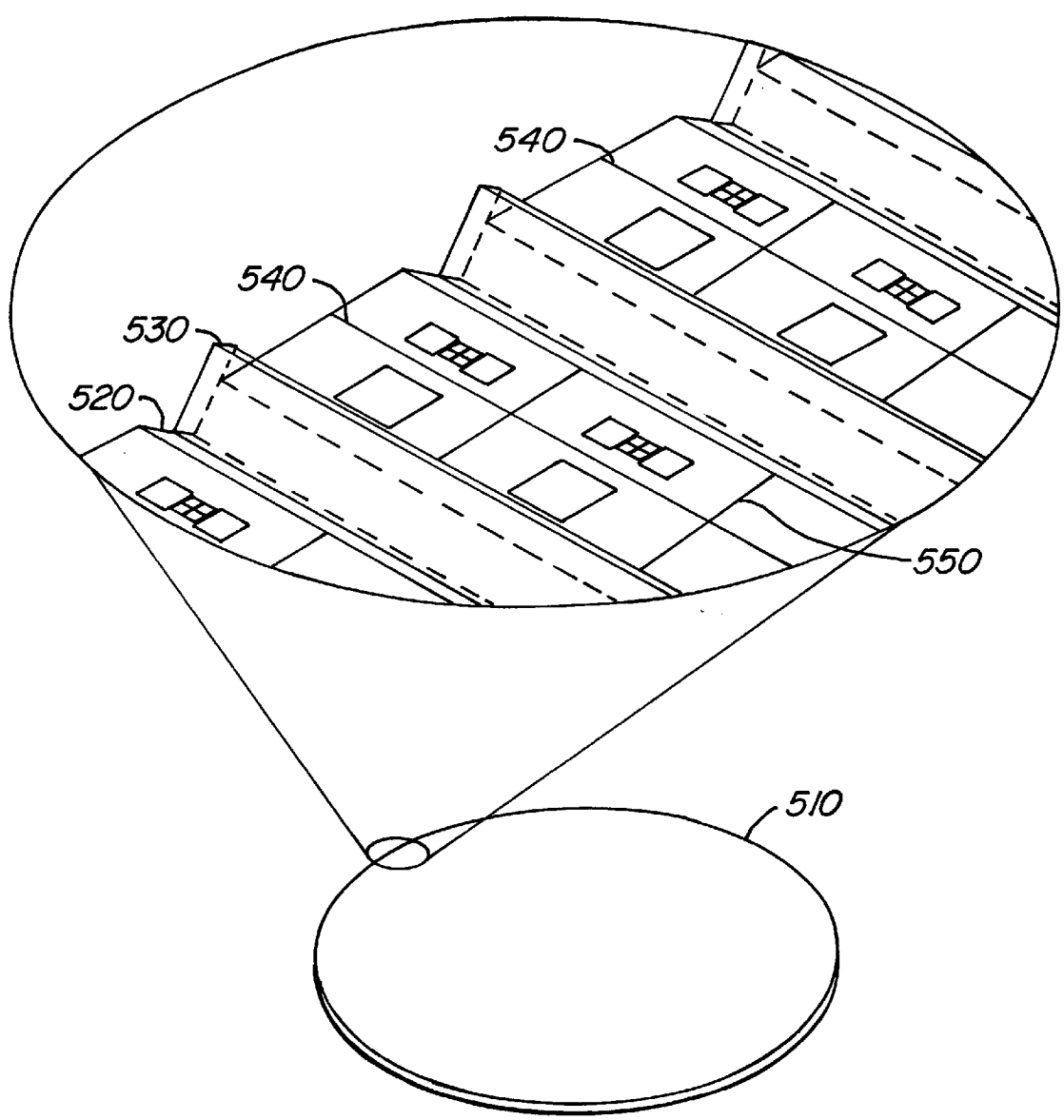
FIG. 5 is a diagram of a silicon wafer of the photo detector with etched groove and micro mirror.

The advantage of this preferred embodiment of this present invention is that the mirror can be mounted on the wafer in the form of strips as illustrated in FIG. 5. As shown in FIG. 5, V-shaped grooves such as 520 have been etched on the photo detector wafer 510. A thin strip of mirror 530 about 0.20 mm ×50 mm is attached to the 45 degree surface of the groove by means of an adhesive. The mirror is about 0.1 mm thick. After mirrors are attached to all the grooves on the surface of the wafer, the wafer is diced by a dicing saw along lines 540 and 550 to separate the wafer into small dies.

Figure 6:
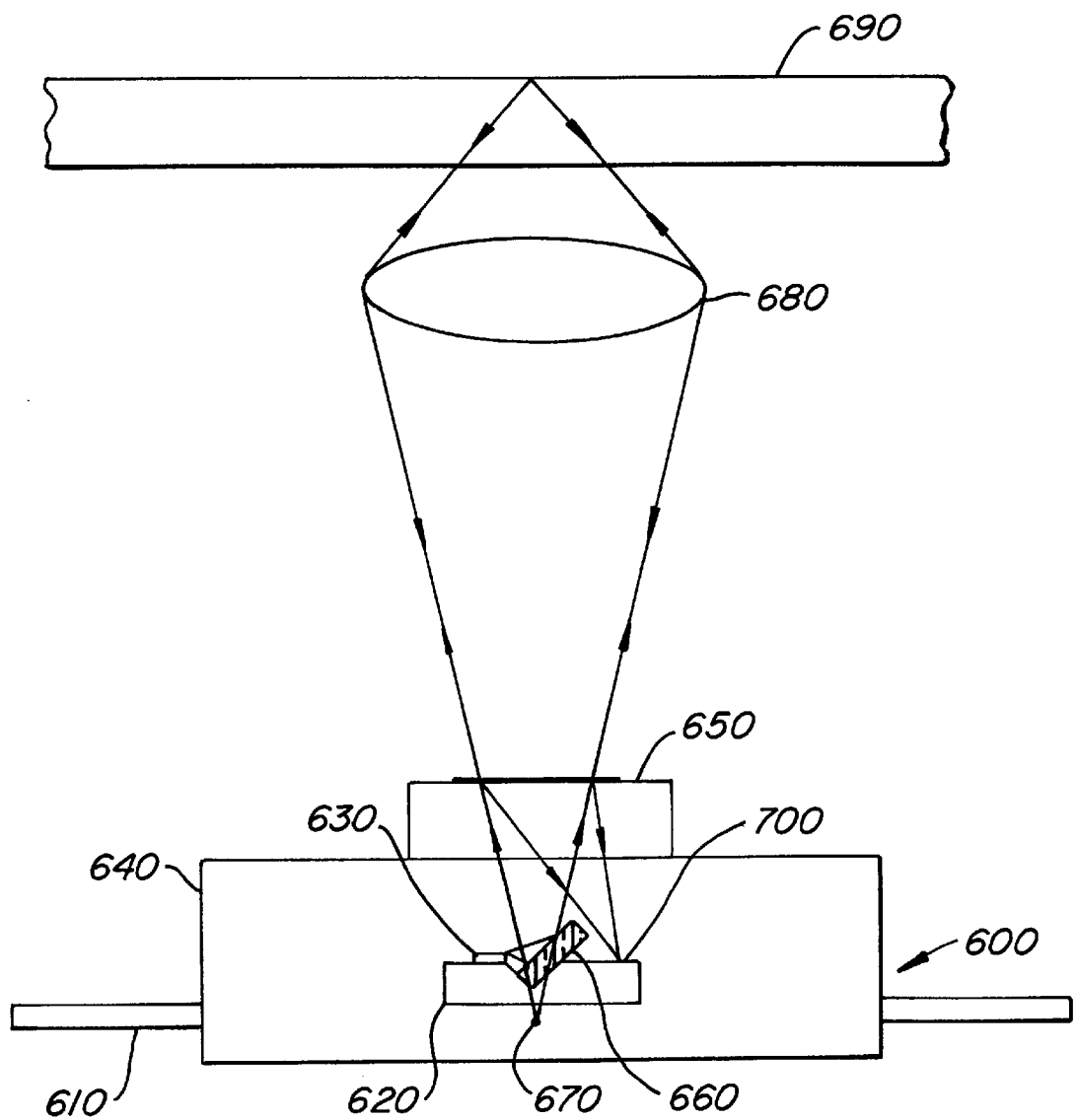
FIG. 6 is a diagram of an optical system with the photo detector mounted on a lead frame and molded in plastic with a hologram mounted on its top surface.

FIG. 6 shows the completed device 600 using this integrated laser/detector chip. The detector chip 620 is first mounted on a lead frame 610. Secondly the laser chip 630 is mounted on the detector chip 620. Wire bonds are made between all the electrical contacts of the laser and photo detectors to the leads. The lead frame is then encapsulated in optically clear plastic material 640. A holographic optical element 650 is mounted on top of the plastic package to direct the return beam to the detectors inside the package.

FIG. 6 also shows how the device of the present invention is used in an optical pickup. Light emitted from the laser chip 630 is reflected by mirror 660. A virtual image of the laser source is indicated by point 670. With the corrugated structure on the mirror the laser beam is split into three or more beams. These beams pass through the holographic optical element 650 and are focused by the objective lens 680 to a medium 690. The reflected beam from the medium is diffracted by the holographic optical element 650 to the detectors 700.

As would be understood by those skilled in the art, the present invention may be embodied other specific forms without departing from the invention. For example, the laser chip could be a surface emitting laser of the type described in U.S. Pat. No. 4,906,839, with the mirror and the groove having a corrugated surface. Alternately, a surface emitting laser could be used with a corrugated mirror bond into the groove, so that it need not extend above the surface of the chip as in the embodiment of FIG. 2 herein. The corrugated structure of the mirror could be simply a diffraction pattern deposited on the mirror surface.

The multiple element photo detector could be other than four elements or six elements. In addition, it need not be on the opposite side of the laser, but could be at right angles to the mirror from the laser on either side or both sides. Yet another embodiment, a multiple element detector could be placed next to the laser itself, on the same side of the mirror.

Accordingly, the forgoing description is to be illustrative but, not limiting, of the scope of the invention which is set forth in the following claims.

What is claimed is:

1. An apparatus comprising:
    a semiconductor laser on a semiconductor chip, said laser emitting a laser beam along a plane parallel to a surface of said semiconductor chip;
    a groove in said chip in a direction of said laser beam from said semiconductor laser;
    a mirror mounted in said groove; and
    a corrugated structure on said mirror configured to split said laser beam into multiple beams.

2. The apparatus of claim 1 wherein said corrugated structure is a grating pattern.

3. The apparatus of claim 1 wherein said mirror extends above a surface of said chip.

4. The apparatus of claim 1 further comprising a multiple element photodetector mounted on said chip adjacent said mirror at a position other than a position of said laser.

5. The apparatus of claim 4 wherein said multiple element photodetector comprises four detector elements positioned to detect a data signal and a focus error signal and two detector elements positioned to detect a tracking error signal.

6. The apparatus of claim 1 wherein said semiconductor laser is a separate chip from said semiconductor chip, and is bonded to said semiconductor chip.

7. The apparatus of claim 1 wherein said mirror is bonded to said groove.

8. The apparatus of claim 1 further comprising a detector element mounted behind said semiconductor laser positioned to detect a back emission of said semiconductor laser.

9. The apparatus of claim 1 further comprising:
    a lead frame supporting said semiconductor chip; and
    an optically clear plastic package encapsulating said semiconductor chip and at least a portion of said lead frame.

10. The apparatus of claim 1 further comprising a holographic element mounted over said mirror.

11. An apparatus comprising:
    a semiconductor laser on a semiconductor chip, said laser emitting a laser beam along a plane parallel to a surface of said semiconductor chip;
    a groove in said chip in a direction of said laser beam from said semiconductor laser;
    a mirror bonded to a surface of said groove;
    a corrugated structure on said mirror configured to split said laser beam into multiple beams;
    a multiple element photodetector mounted on said chip adjacent said mirror at a position other than a position of said laser; and
    a detector element mounted behind said semiconductor laser positioned to detect a back emission of said semiconductor laser.

12. A method for manufacturing a laser/detector device comprising:
    forming a plurality of semiconductor lasers on a semiconductor wafer, said lasers being constructed to emit laser beams along a plane parallel to a surface of said semiconductor wafer;
    forming a plurality of grooves in said wafer in a direction of said laser beams from said semiconductor lasers;
    forming a plurality of multiple element photodetectors on said chip adjacent said grooves at a position other than a position of said lasers;
    forming a plurality of detector elements behind said semiconductor lasers positioned to detect a back emission of said semiconductor lasers;
    forming a corrugated structure on a plurality of mirrors such that an incident laser beam is split into multiple beams;
    bonding said mirrors to a surface of said grooves; and
    dicing said wafer into a plurality of chips.

* * * * *